US008417805B2

(12) United States Patent
Zeine et al.

(10) Patent No.: US 8,417,805 B2
(45) Date of Patent: Apr. 9, 2013

(54) CONTROLLING EXECUTION OF SERVICES ACROSS SERVERS

(75) Inventors: Hatem Zeine, Redmond, WA (US); Meir Shmouely, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 12/693,948

(22) Filed: Jan. 26, 2010

(65) Prior Publication Data

US 2011/0185050 A1 Jul. 28, 2011

(51) Int. Cl.
*G06F 15/173* (2006.01)
(52) U.S. Cl.
USPC .......... 709/223; 709/203; 709/217; 709/224; 718/105
(58) Field of Classification Search ............ 709/223, 709/224, 203, 217, 219, 220; 718/105; 714/25, 714/E11.02
See application file for complete search history.

(56) References Cited

U.S. PATENT DOCUMENTS

| | | | |
|---|---|---|---|
| 6,640,239 B1 | 10/2003 | Gidwani | |
| 6,993,763 B2 * | 1/2006 | Hayes, Jr. ...................... | 718/102 |
| 7,076,801 B2 | 7/2006 | Gong et al. | |
| 7,127,716 B2 * | 10/2006 | Jin et al. ......................... | 718/105 |
| 7,512,702 B1 | 3/2009 | Srivastava et al. | |
| 7,665,093 B2 * | 2/2010 | Maybee et al. ............... | 718/106 |
| 8,145,761 B2 * | 3/2012 | Liu et al. ......................... | 709/226 |
| 2002/0032777 A1 * | 3/2002 | Kawata et al. ................. | 709/226 |
| 2002/0073134 A1 * | 6/2002 | Barnett et al. ................. | 709/105 |
| 2003/0018830 A1 * | 1/2003 | Chen et al. ..................... | 709/328 |
| 2004/0107273 A1 * | 6/2004 | Biran et al. ..................... | 709/223 |
| 2005/0102400 A1 * | 5/2005 | Nakahara et al. ............. | 709/225 |
| 2006/0015873 A1 * | 1/2006 | Dettinger et al. ............. | 718/102 |
| 2006/0069780 A1 * | 3/2006 | Batni et al. ..................... | 709/226 |
| 2006/0230407 A1 * | 10/2006 | Rosu et al. ..................... | 718/105 |
| 2007/0011330 A1 * | 1/2007 | Dinker et al. .................. | 709/226 |
| 2007/0130341 A1 * | 6/2007 | Ma .................................. | 709/226 |
| 2008/0016206 A1 * | 1/2008 | Ma et al. ......................... | 709/224 |
| 2008/0270490 A1 | 10/2008 | Watterott et al. | |
| 2009/0044265 A1 | 2/2009 | Ghosh et al. | |
| 2010/0153524 A1 * | 6/2010 | Rehm et al. .................... | 709/221 |
| 2011/0119373 A1 * | 5/2011 | Chan et al. ..................... | 709/224 |
| 2011/0153824 A1 * | 6/2011 | Chikando et al. ............. | 709/226 |

OTHER PUBLICATIONS

Replication and Load Balancing Strategy of STAR's Relational Database Management System (RDBM)—Published Date: 2008 http://www.iop.org/EJ/article/1742-6596/119/4/042009/jpconf8_119_042009.pdf?request-id=0d636eb5-dcdc-43ea-b29c-1db9fb5e88cb.
SCS: A VM-Based Approach to Achieve High Scalable and Available Server Environment—Published Date: Mar. 1, 2007 http://www.aicit.org/jcit/papers/jcit2-1/2.%20SCS.pdf.

(Continued)

*Primary Examiner* — Lashonda Jacobs
(74) *Attorney, Agent, or Firm* — Microsoft Corporation

(57) ABSTRACT

Computer and internet applications are commonly hosted by a large number of servers, such as a data warehouse. One concern when hosting applications is execution reliability of the applications. Unfortunately, it may be the applications themselves that provide the point of failure (e.g., an executing service creates a memory leak that causes a server to fail). Because servers are often replicated, a failure of a single executing service may become a single point of failure for every server. Accordingly, one or more systems and techniques for balancing server loads are disclosed herein. A load balancer may be configured to delegate the execution of a service amongst a plurality of servers such that no server executes all services and no service executes on all servers. The distribution of service execution amongst the plurality of servers provides service execution diversity across servers that otherwise may be configured identically with services.

20 Claims, 7 Drawing Sheets

OTHER PUBLICATIONS

Balancing Workload based on Content Types for Scalable Web Server Clusters—Published Date: Mar. 2004 http://ieeexplore.ieee.org/stamp/stamp.jsp?arnumber=01283812.

The Cost of a Cloud: Research Problems in Data Center Networks—Retrieved Date: Nov. 24, 2009 http://research.microsoft.com/en-us/um/people/dmaltz/papers/DC-Costs-CCR-editorial.pdf.

* cited by examiner

SERVICE DISTRIBUTION CONFIGURATION — 502

| | SERVICE (1) 504 | SERVICE (2) 506 | SERVICE (3) 508 | SERVICE (4) 510 | SERVICE (5) 512 | ... | SERVICE (N) |
|---|---|---|---|---|---|---|---|
| SERVER (A) | | ✓ | | | | | |
| SERVER (B) | ✓ | ✓ | | | | | ✓ |
| SERVER (C) | | | ✓ | | ✓ | | |
| SERVER (D) | | ✓ | ✓ | ✓ | ✓ | | ✓ |
| SERVER (E) | | | | ✓ | | | |
| ... | | | | | | | |
| SERVER (N) | | ✓ | | | ✓ | | |

CONTROLLING EXECUTION OF SERVICES ACROSS SERVERS

BACKGROUND

With the increase in complexity of today's computer and internet applications, such applications are commonly divided into multiple services. For example, a news website may be divided into a service that updates a stock ticker, a service that retrieves sports scores, and other services that perform various functions for the news website. Dividing a complex application into multiple services allows the complex application to continue operating even though one or more of the services fails. That is, the complex application may still operate as a whole without the functionality of a failed service. Furthermore, the servers executing the services may be replicated to mitigate server hardware failures. For example, a single configuration may be replicated across all servers. If a server fails due to a hardware issue, then there are multiple other servers still operable to execute the services as needed. Accordingly, sports scores may continually be available to a website, for example, even if one server providing the sport score service fails. Unfortunately, however, if a service is executing on all servers and the service misbehaves, then potentially all of the servers may fail (e.g., a memory leak by a service may force the servers executing the service to become unresponsive and fail).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, a technique for balancing server loads is disclosed herein. That is, a load balancer operatively coupled to a plurality of servers is configured to delegate service execution workflow across the plurality of servers. Respective servers within the plurality of servers are configured to host a plurality of services. In one example, the servers within the plurality of servers may be identically (or substantially identically) configured to host the plurality of services (e.g., respective servers within the plurality of servers are installed with similar services in an idle state). In another example, the servers within the plurality of servers may be configured to host the plurality of services differently from one another (e.g., server (A) may have services (1-5) installed in an idle state, while server (B) may have services (3-10) installed in an idle state).

The load balancer may be configured to delegate the service execution workflow such that more than one but fewer than all servers invoke a service into an execution state from an idle state. In particular, the load balancer may be configured such that no server executes all services and no service executes on all servers. Alternatively, the service execution workflow may be delegated such that one or more but fewer than all service may invoke the service into an execution state.

In one example, respective servers within the plurality of servers may be identically (or substantially identically) configured to host the plurality of services. To create diversity of service execution amongst the servers, the load balancer may specify service execution workflow in such a way that no server executes all services and no service executes on all servers. For example, the load balancer may omit one or more servers within the service execution workflow when requesting execution of a service from the plurality of server. That is, it is the load balancer that is configured to create diversity of service execution amongst the servers based upon how service execution workflow is delegated.

In an alternative example, a distribution configuration generator may be operatively couple to the plurality of servers. The distribution configuration generator may be configured to maintain a service distribution configuration specifying server to service execution mappings such that respective services are mapped to more than one but fewer than all servers for prospective execution. A load balancer may be configured to delegate service execution workflow based upon the service distribution configuration. In particular, the service distribution configuration may be maintained such that no server executes all services and no service executes on all servers. It may be appreciated that the service distribution configuration may be generated to specify server to service execution mappings such that respective services are mapped to one or more but fewer than all servers for prospective execution.

In another alternative example, a service exclusion configuration may be generated for the services within the plurality of services such that at least one but fewer than all servers are excluded from invoking respective services into an execution state. In particular, for respective services, the service exclusion configuration specifies one or more servers as excluded from executing the service. The service exclusion configuration may specify server exclusion such that no server executes all services and no service executes on all servers. A load balancer may be configured to delegate service execution workflow based upon the service exclusion configuration.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 5 is an illustration of an example of a service distribution configuration.

DETAILED DESCRIPTION

Figure 1:
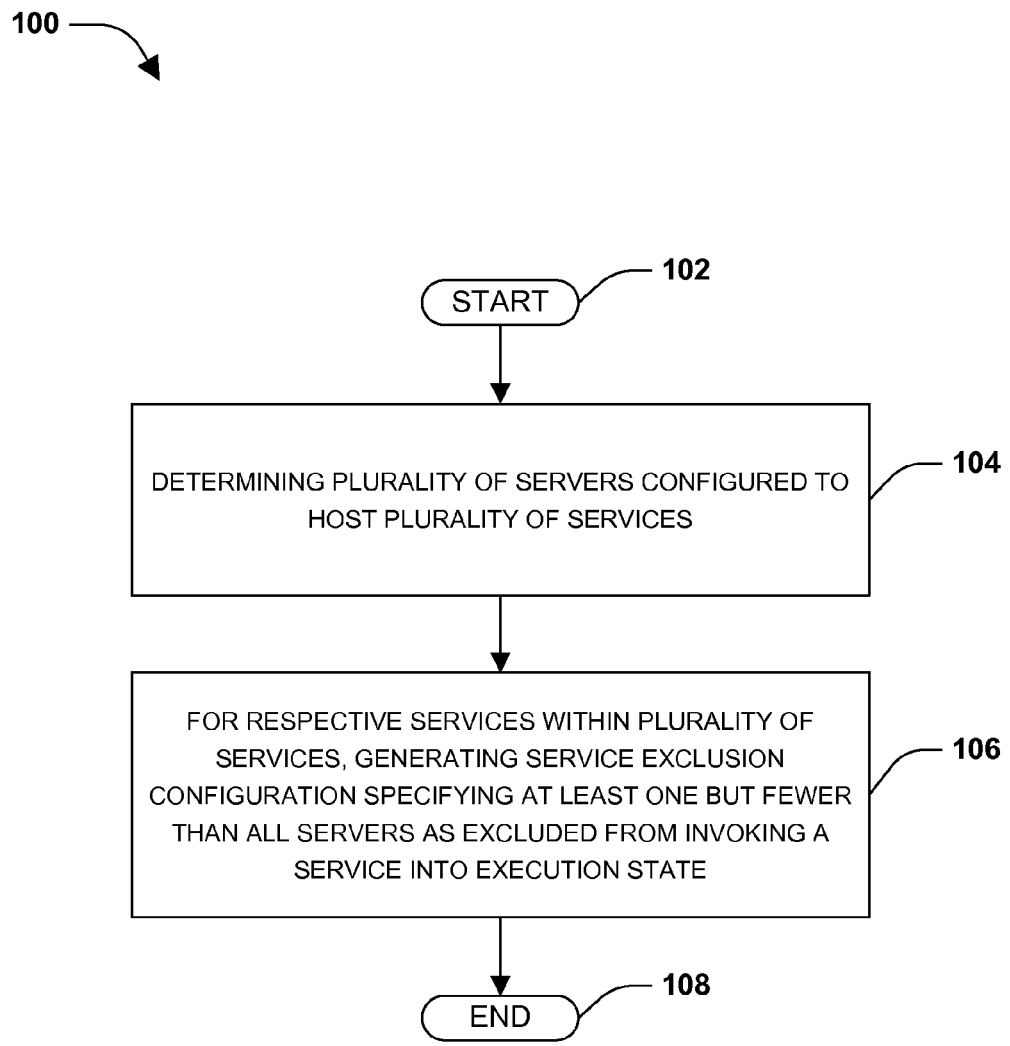
FIG. 1 is a flow chart illustrating an exemplary method of balancing server loads.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, computer and internet applications are commonly divided into multiple services that are spread across multiple servers to increase processing efficiency and mitigate downtime due to hardware failures. Currently, server replication is one technique used to overcome hardware failures. That is, if one of the servers executing a service fails, then other servers executing the service may be relied upon. However, this approach does not solve issues arising from software failures. For example, if a service comprises a portion of code that causes a server executing it to fail and shutdown, then every server executing the service will fail when the service encounters the same bug. This is a problem if the servers are configured identically to execute the service because every server may fail when the service enters the "bad" portion of code causing the service to fail and the server to lock up. One solution could be to directly configure the servers different from one another. Unfortunately, management of multiple servers with multiple configurations becomes a difficult task (e.g., 100 different servers with 100 different server configurations).

Accordingly, one or more systems and/or techniques for balancing server loads are provided herein. In particular, a load balancer configured to delegate service execution workflow such that no server executes all services and no services runs on all servers. It may be appreciated that service execution workflow may be interpreted as instructions from the load balancer to one or more servers regarding the execution of one or more services. In one example, a plurality of servers are identically (or substantially identically) installed and configured with services. It is the load balancer that is configured to delegate service execution workflow to create a diverse service execution amongst the servers. For example, every service may be installed and idle on every server. However, the load balance may be configured to omit particular servers when requesting execution of certain services such that no server executes all services and no services executes on all servers.

It may be appreciated that a service in an idle state may continuously loop through a small portion or percentage of the service's code, while the service in an execution state may execute a much larger portion of the service's code. In this way, the service in an idle state does not enter into the majority of the service's code, and thus has a lesser probability of entering code that may cause the service to fail. Additionally, the (smaller) portion of code that is executed or looped through when a service is in an idle state may be less prone to problems as this code may not cause substantive actions to be performed. Rather, this portion of code may merely comprise an innocuous outermost loop of pre-processing activities, for example. Accordingly, as provided herein, a particular service may be in an idle state across all servers, but not in an execution state across all servers.

The load balancer provides application reliability because it may be configured to delegate service execution workflow so that no service is a single point of software failure across every server. That is, a single "unruly" service is omitted from at least one server so that the "unruly" service does not cause every server to fail. In one example, a service may be configured to execute on at least two servers to mitigate an overall execution failure of the service due to a single server failing because of a hardware issue (e.g., service (1) may execute on at least server (A) and server (B) in case one of the servers fails). The load balancer may improve performance of the plurality of servers because a resource intensive service may be omitted from at least over server (e.g., an already overburdened server may be omitted from executing a resource intensive service). That is, there are other servers relieved from executing a particular service because service execution workflow is delegated such that no service executes on all servers. In the event of a server failure, a diagnostic component may generate a list of servers that are still running, along with service executing on the running servers. The service causing the failure may be determined based upon what services are missing from the servers that are still running.

The initial configuration of the plurality of servers may be simplified because the plurality of servers may be initially installed with services in an identical configuration. It is the load balancer that provides the diversity of service execution amongst the servers based upon how the load balancer delegates service execution workflow (e.g., the server may omit one or more servers when requesting execution of a service). Furthermore, the load balancer may enhance performance of the plurality of servers by evenly balancing service execution workload amongst the servers based upon resource requirements of the services and/or servers. For example, the load balancer may take RAM, CPU, network bandwidth, and/or other requirements into consideration.

One embodiment of balancing server loads is illustrated by an exemplary method 100 in FIG. 1. At 102, the method begins. At 104, a plurality of servers configured to host a plurality of services is determined. For example, a data warehouse of servers may be configured to run multiple services associated with one or more computer and/or internet applications. It may be appreciated that the servers may be configured identical (or substantially identical) or different from one another. At 106, for respective services within the plurality of services, a service exclusion configuration specifying at least one but fewer than all servers as excluded from invoking a service into an execution state may be generated. That is, upon receiving a service execution request corresponding to a service (e.g., a sports updating service is called by a web page to execute code to retrieve updated sports scores for display within the web page), service execution workflow may be delegated based upon the service exclusion configuration of the service. In particular, the service may be invoked into an execution state by at least one server but fewer than all servers. It may be appreciated that the service remains in an idle state within the excluded servers. For example, servers specified as excluded with respect to a sports updating service within the service exclusion configuration may be excluded from service execution workflow corresponding to the execution of the sports updating service.

In one example, the service exclusion configuration may be generated so that no server within the plurality of servers executes all services and no service within the plurality of services executes on all servers. The service exclusion configuration may be used by a load balancer to create diversity amongst the plurality of servers when delegating service execution workflow, even though the servers may be configured identically.

The service exclusion configuration may be utilized to enhance performance of service execution due to the diversity created by the service exclusion configuration. For example, the service exclusion configuration may be generated based upon resource requirements of servers and/or services. For example, servers having additional processing capacity may be allowed to execute resource intensive services, while overburdened servers may be excluded from executing the resource intensive services. Resource requirements may be RAM, CPU, network bandwidth, and/or other resource requirements.

Diagnostic information may be generated when one or more servers fail. In one example, diagnostic information comprising a list of running severs (e.g., servers that did not fail) and their respective executing services may be generated. From this, it may be determined which services caused the failure based upon which services are missing from the list. It may be appreciated that services within the list may be ruled out as suspect services, while missing services may be deemed as suspect causes of the failure.

Figure 2:
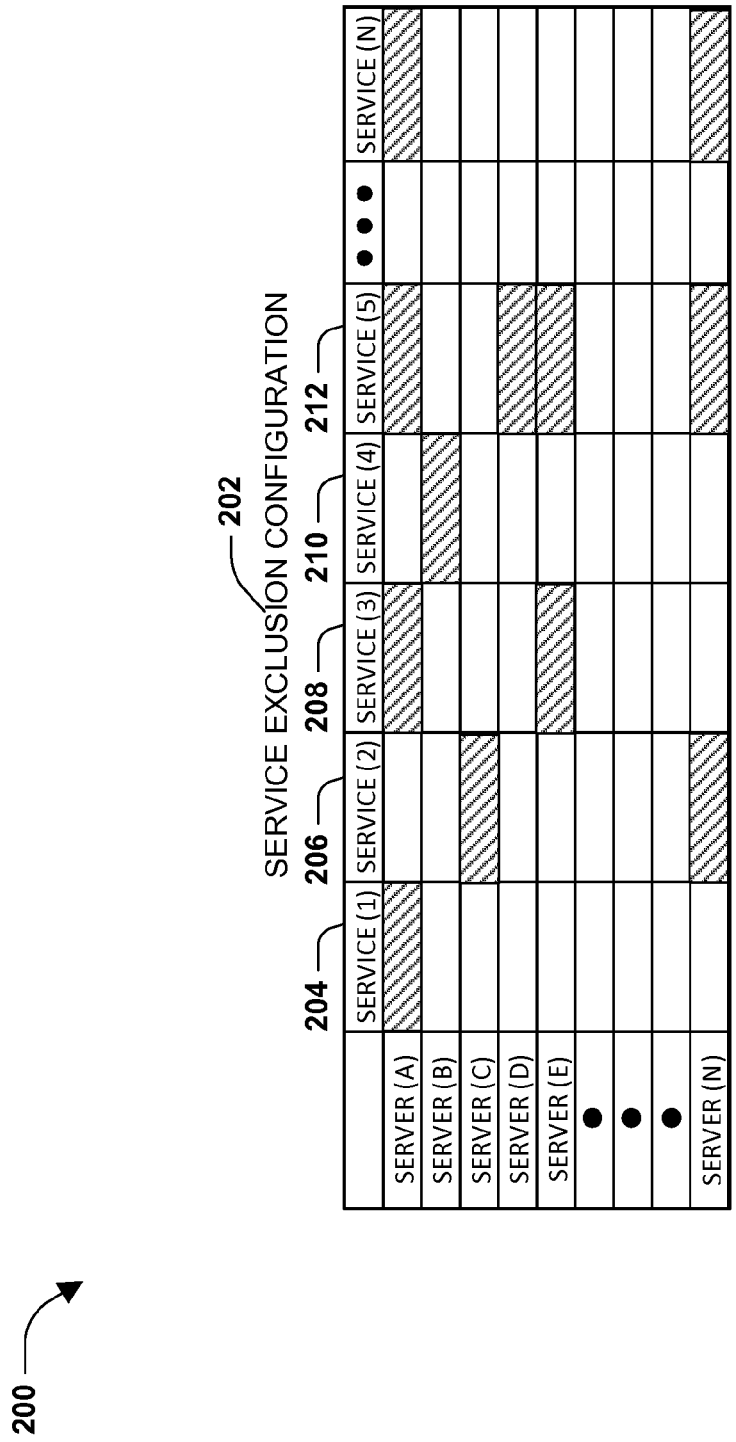
FIG. 2 is an illustration of an example of a service exclusion configuration.

FIG. 2 illustrates an example of a service exclusion configuration 202. It may be appreciated that while the example of the service exclusion configuration 202 illustrates servers (A) through (N) and services (1) through (N), that a service exclusion configuration may be configured to balance server loads for many more servers and services (e.g., hundreds or more). The service exclusion configuration 202 specifies one or more servers that are excluded from executing one or more services. In one example, service execution workflow may be delegated such that service (1) 204 is excluded from being invoked into an execution state by server (A) and/or other excluded servers not illustrated. However, service execution workflow may be delegated such that service (1) 204 may be invoked into an execution state by server (B), server (C), server (D), server (E), and/or other servers not illustrated. In this way, if service (1) 204 causes a failure (e.g., a shutdown failure) of the servers (e.g., servers B, C, D, and E) executing service (1) 204, then server (A) and/or other excluded servers not illustrated may continue operating unaffected by the failure of service (1) 204.

In another example, service execution workflow may be delegated such that service (2) 206 is excluded from being invoked into an execution state by server (C), server (N), and/or other excluded servers not illustrated. However, service execution workflow may be delegated such that service (2) may be invoked into an execute state by server (A), server (B), server (D), server (E), and/or other servers not illustrated. In this way, if service (2) 206 causes a failure of the servers (e.g., servers A, B, D, and E) executing service (2) 206, then server (C), server (N), and/or other excluded servers no illustrated may continue operating unaffected by the failure of service (2) 206.

In one example, a load balancer may utilize the service exclusion configuration 202 when delegating service execution workflow. For example, a request for service (3) 208 to execute code to update sports scores of a web page may be received. A load balancer may delegate the execution of the service (3) 208 to server (B), server (C), server (D), and/or server (N) based upon the service exclusion configuration 202. However, the load balancer may omit server (A) and server (E) from the service execution workflow because the service exclusion configuration 202 excludes server (A) and server (E) from executing service (3) 208. The load balancer may utilize the service exclusion configuration 202 to create diversity amongst the plurality of servers (e.g., server (A) through sever (N)) so that at least one service is omitted from respective servers such that no server runs all services and no service runs on all servers. That is, if service (3) 208 fails such that servers executing service (3) 208 shutdown, then excluded servers (e.g., server A and server E) may continue operating unaffected by the failure of service (3) 208. It may be appreciated that the exclusion of servers within the service exclusion configuration 202 may be specified in a systematized manner.

Figure 3:
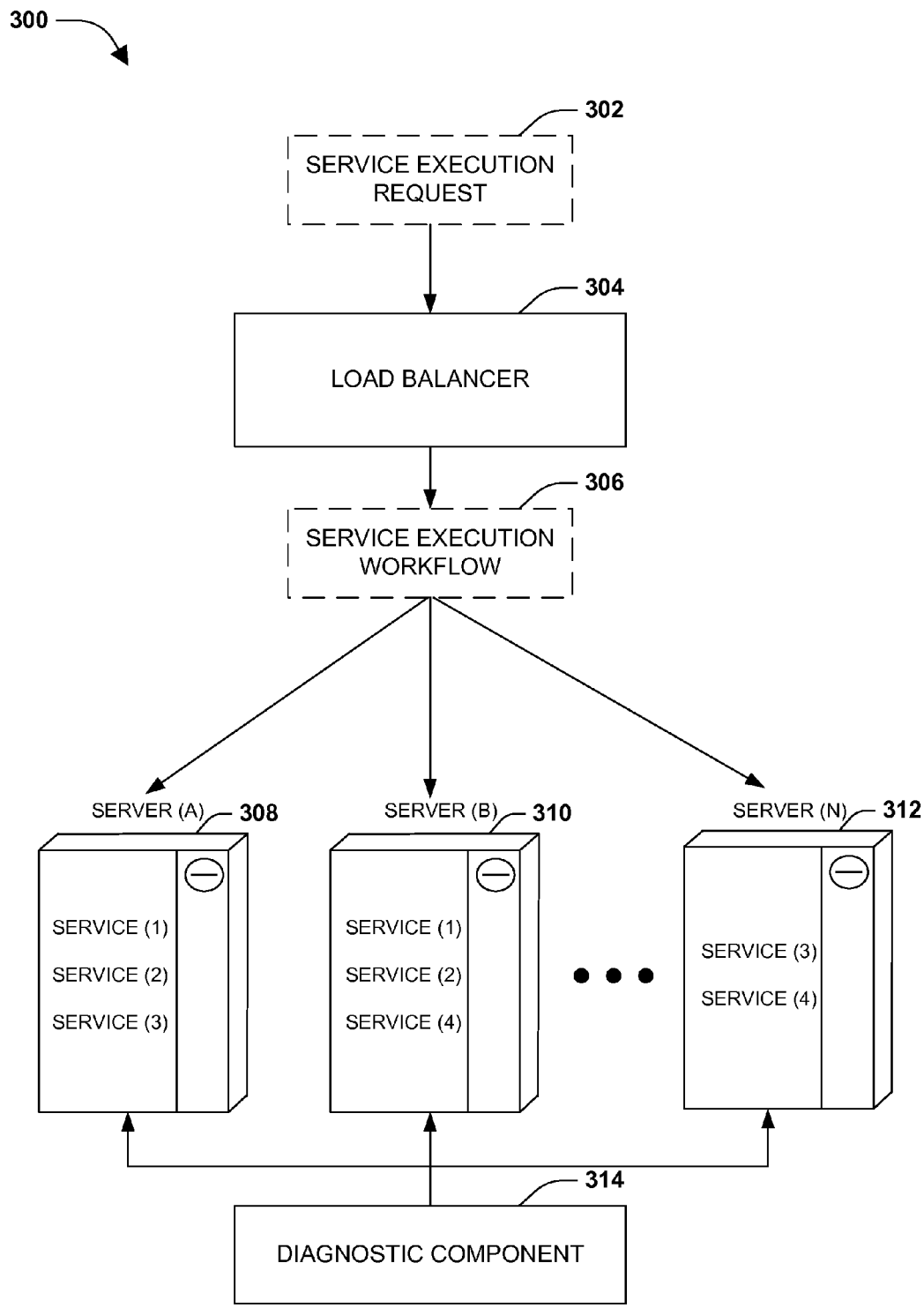
FIG. 3 is a component block diagram illustrating an exemplary system for balancing server loads.

FIG. 3 illustrates an example of a system 300 configured for balancing server loads. It may be appreciated that while the example of system 300 illustrates servers (A) through (N) and services (1) through (4), that system 300 may be configured to balance server loads for many more servers and services (e.g., hundreds or more). The system 300 may comprise a load balancer 304 and/or a diagnostic component 314. The load balancer 304 and/or the diagnostic component 314 may be operatively coupled to a plurality of servers (e.g., server (A) 308, server (B) 310, server (N) 312, and other servers not illustrated) configured to host a plurality of services (e.g., service (1), service (2), service (3), service (4), and other services not illustrated). In one example, the servers within the plurality of servers may have identical (or substantially identical) configurations (e.g., identical installation of services in an idle state). In another example, the servers within the plurality of servers may have configurations different from one another.

The load balancer 304 may be configured to delegate service execution workflow 306 specifying more than one but fewer than all servers to invoke a service into an execution state from an idle state. In one example, the load balancer 304 may restrict a service from entering an execute state on all servers concurrently by excluding one or more servers from the service execution workflow 306. In another example, the load balancer 304 may restrict a server from entering an execution state on fewer than two servers by specifying at least two servers as allowed to execute the server within the service execution workflow 306. It may be appreciated that the load balancer 304 may delegate the service execution workflow 306 such that no server executes all services and no service executes on all servers.

The load balancer 304 may be configured to receive a service execution request 302 corresponding to a service. For example, a request to execute code corresponding to service (5) may be received by the load balancer 304. The load balancer 304 may delegate the service execution workflow 306 specifying one or more servers to execute the code corresponding to service (5) such that more than one but fewer than all servers invoke service (5) into an execute state. It may be appreciated that the diversity of service (5) execution mitigates the potential that service (5) may be a single point of failure for the plurality of servers because one or more servers are excluded within the service execution workflow from executing service (5).

The load balancer 304 may delegate service execution workflow 306 based upon resource requirements of the respective services and/or servers. For example, service (5) may require a large amount of memory for execution. Within the plurality of servers, server (A) 308 may have additional unused memory in comparison with the overburdened server (B) 310. The load balancer 304 may exclude service (5) from executing on server (B) 310, but allow execution on server (A) 308 based upon the large memory requirement.

The diagnostic component 314 may be configured to generate diagnostic information when one or more servers within the plurality of servers fail. The diagnostic component 314 may create diagnostic information comprising a list of running servers and their respective executing services.

Figure 4:
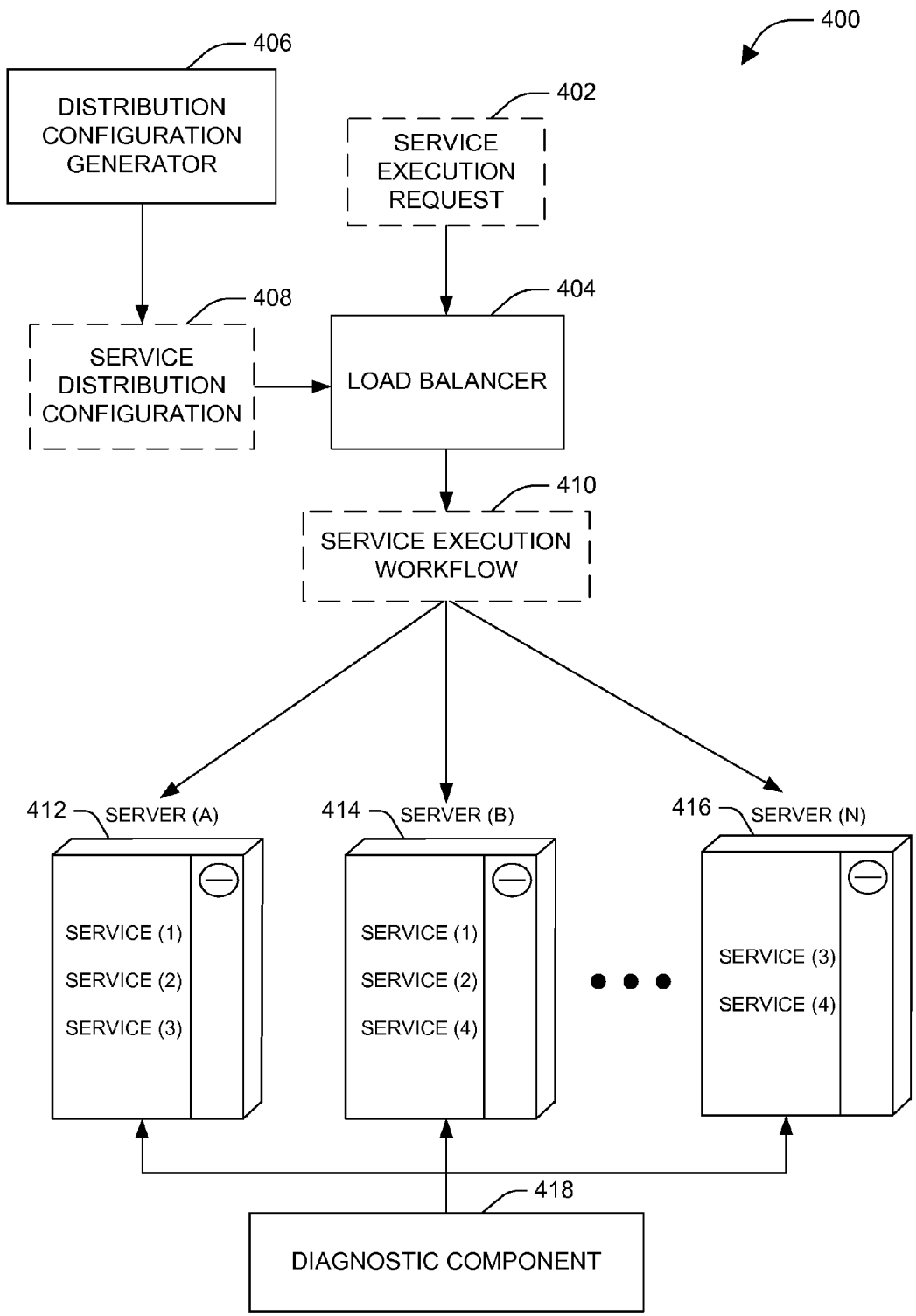
FIG. 4 is a component block diagram illustrating an exemplary system for balancing server loads.

FIG. 4 illustrates an example of a system 400 configured for balancing server loads. It may be appreciated that while the example of system 400 illustrates servers (A) through (N) and services (1) through (4), that system 400 may be configured to balance server loads for many more servers and services (e.g., hundreds or more). The system 400 may comprise a load balancer 404, a distribution configuration generator 406, and/or a diagnostic component 418. The load balancer 404, the distribution configuration generator 406, and/or the diagnostic component 418 may be operatively coupled to a plurality of servers (e.g., server (A) 412, server (B) 414, server (N) 416, and other servers not illustrated) configured to host a plurality of services (e.g., service (1), service (2), service (3), service (4), and other services not illustrated). For example, server (A) 412, server (B) 414, and server (C) 416 may be installed with service (1), service (2), service (3), and service (4) in an idle state. The diagnostic component 418 may be configured to generate diagnostic information comprising a list of running servers and their respective services (e.g., services in an execution state within the running servers).

The distribution configuration generator 406 may be configured to maintain a service distribution configuration 408 (e.g., service distribution configuration 502 of FIG. 5) specifying server to service execution mappings. It may be appreciated that the server to service execution mappings may map services to more than one but fewer than all servers for prospective execution. In particular, the service distribution configuration may comprise server to service execution mappings such that no server runs all services and no services runs on all servers. In one example, a server to service execution mapping may designate a server that is allowed to execute a service. It may be appreciated that a server that is not mapped to a service within the service distribution configuration 408 is excluded from executing the service. The distribution configuration generator 406 may be configured to maintain the service distribution configuration 408 based upon resource requirements of the services and/or servers.

The load balancer 404 may be configured to utilize the service distribution configuration 408 to create service execution diversity amongst the plurality of servers. That is, the load balancer 404 may delegate service execution workflow based upon the service distribution configuration 408 so that no server executes all services and no server executes on all servers. In this way, if a service fails causes servers executing it to shutdown, then other servers not executing the service (e.g., servers not mapped to the service within the service distribution configuration) may be unaffected by the service's failure.

In one example, the load balancer 404 may be configured to receive a server execution request 402 corresponding to a service. The load balancer may delegate service execution workflow 410 to invoke the service into an execution state within more than one but fewer than all servers based upon the service distribution configuration 408. The delegate service execution workflow 410 may specify one or more servers allowed to execute the service such that no server is executing all services and no service e executes on all servers. In one example, the load balancer 404 may specify one or more servers within the service execution workflow 410 to invoke the service into an execution state based upon the one or more servers being mapped to the service within the server to service execution mappings of the service distribution configuration 408. Servers not mapped to the service within the service distribution configuration 408 are excluded from the service execution workflow 410 by the load balancer 404.

FIG. 5 illustrates an example of a service distribution configuration 502. It may be appreciated that while the example of the service distribution configuration 502 illustrates servers (A) through (N) and services (1) through (N), that a service distribution configuration may be configured to balance server loads for many more servers and services (e.g., hundreds or more). The service distribution configuration 502 specifies server to service execution mappings, where respective services are mapped to more than one but fewer than all servers for prospective execution. The service distribution configuration 502 may be utilized by a load balancer to delegate service execution workflow such that no server executes all services and no service executes on all servers.

The service distribution configuration 502 specifies server to service mappings for service (1) 504. For example, service (1) 504 may be executed by server (C) and server (D), but not by server (A), server (B), server (E), and server (N). The server to service mappings for service (1) 504 provides that the load balancer does not allow service (1) 504 to enter an execution state on all servers.

The service distribution configuration 503 specifies server to service mappings for service (2) 506. For example, service (2) 506 may be executed by server (A), server (B), server (C), server (E), and server (N), but not by server (D). The server to service mappings for service (2) 506 provides that the load balancer does not allow service (2) 506 to enter an execution state on all servers.

The service distribution configuration 503 specifies server to service mappings for service (3) 508. For example, service (3) 508 may be executed by server (A), server (C), server (D), and server (E), but not server (B) and server (N). The server to service mappings for service (3) 508 provides that the load balancer does not allow service (3) 508 to enter an execution state on all servers.

It may be appreciated that the service distribution configuration 503 specifies server to services mappings for service (4) 510, service (5) 512, and other services not illustrated. It may be appreciated that a load balancer may utilize the service distribution configuration 503 create diversity in service execution amongst the plurality of servers. Having a diverse distribution of service execution mitigate the harmful effect on the plurality of servers when a service fails. In this way, performance may be enhanced because service execution workflow may be delegated based upon resource requirements of the services and/or servers. Furthermore, diagnostic information may be obtained in the event of a service failure by determining which services are excluded from a list of the remaining running servers and their respective executing services.

Figure 6:
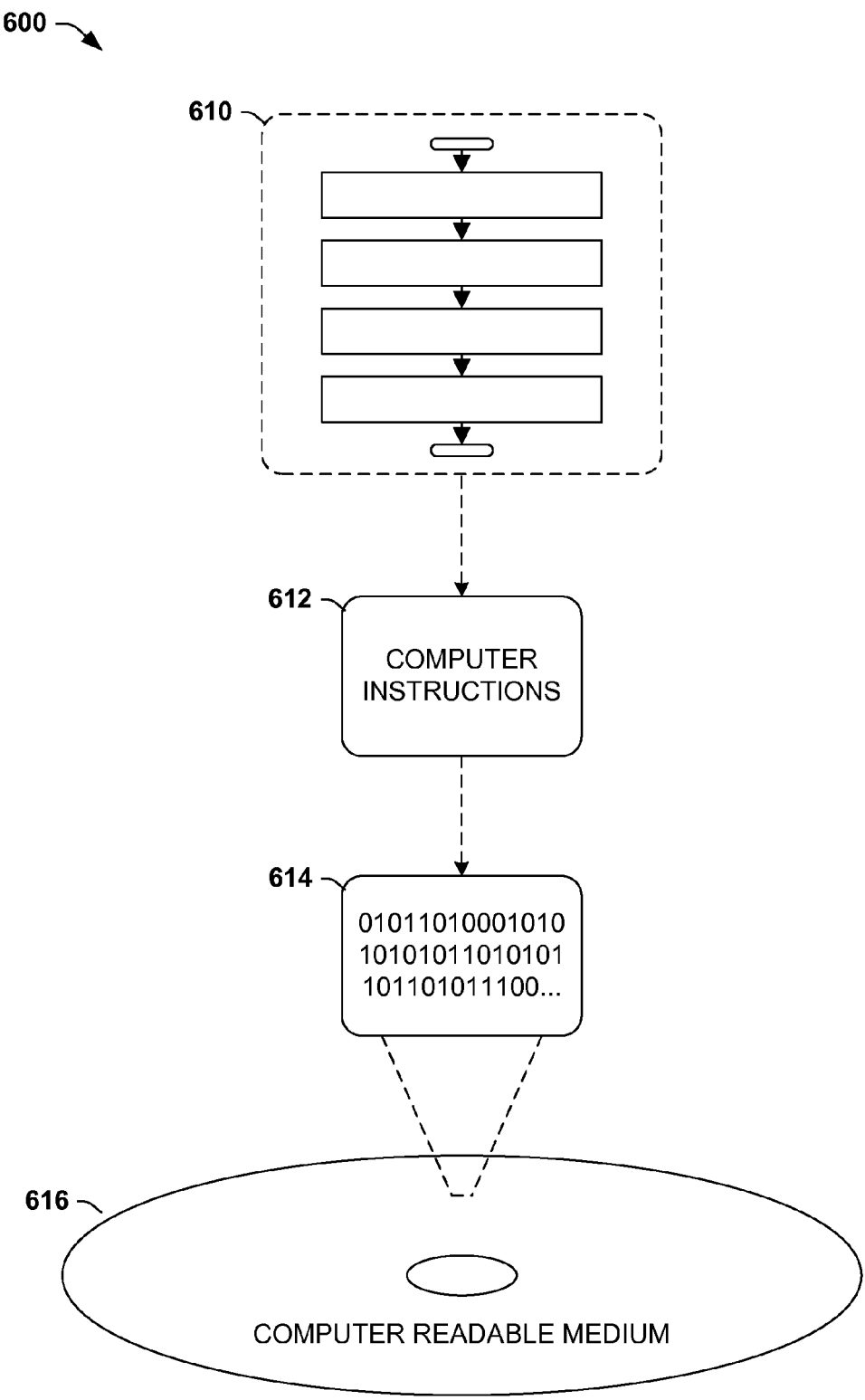
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable instructions 612 may be configured to perform a method 610, such as the exemplary method 100 of FIG. 1, for example. That is, the processor-executable instructions 612 may implement the exemplary method 100 which may be executed via one or more processors. In another such embodiment, the processor-executable instructions 612 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
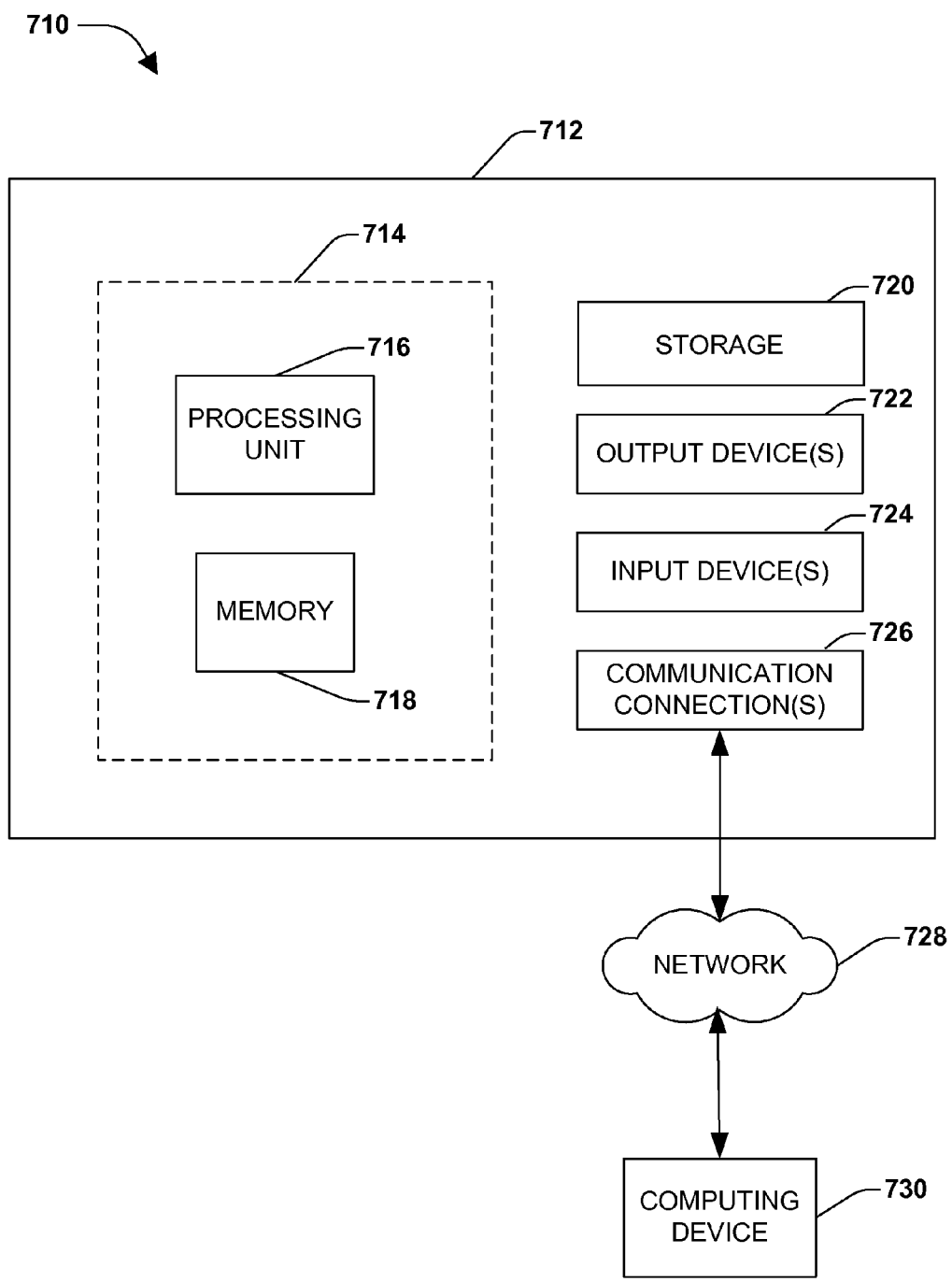
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

What is claimed is:

1. A system for balancing server loads, comprising:
a load balancer operatively coupled to a plurality of servers, respective servers configured to host a plurality of services, the load balancer configured to:
delegate service execution workflow according to a service execution policy specifying that more than one but fewer than all servers are to invoke services into an execution state from an idle state, the service execution workflow policy specifying that a first server and a second server are to redundantly execute a current service, and that a third server is restricted from executing the current service so that problematic execution of the current service, on at least one of the first server or the second server, does not occur on the third server.

2. The system of claim 1, the load balancer configured to:
receive a service execution request corresponding to a service; and
delegate service execution workflow specifying that more than one but fewer than all servers are to invoke the service into an execution state from an idle state based upon the service execution policy.

3. The system of claim 1, comprising:
a diagnostic component configured to:
upon one or more servers within the plurality of servers failing, generate diagnostic information comprising a list of running servers and respective services of the running servers.

4. The system of 1, the load balancer configured to:
delegate service execution workflow based upon resource requirements of respective services within the plurality of services.

5. The system of claim 1, the load balancer configured to:
restrict a service from entering an execution state on all servers concurrently based upon the service execution policy.

6. The system of claim 1, the load balancer configured to:
restrict a service from entering an execution state on fewer than two servers based upon the service execution policy.

7. The system of claim 1, the first server within the plurality of servers having a first server configuration, the second server within the plurality of servers having a second server configuration, and the third server within the plurality of servers having a third server configuration, the first, second and third server configurations different from one another.

8. The system of claim 1, the first server within the plurality of servers having a first server configuration, the second server within the plurality of servers having the first server configuration, and the third server within the plurality of servers having the first server configuration.

9. A system for balancing server loads, comprising:
a distribution configuration generator operatively coupled to a plurality of servers, respective servers configured to host a plurality of services, the distribution configuration generator configured to:
maintain a service distribution configuration specifying server to service execution mappings, a server to service execution mapping assigning a service to more than one but fewer than all servers for prospective execution, the server to service execution mapping specifying that a first server and a second server are to redundantly execute a current service, and that a third server is restricted from executing the current service so that problematic execution of the current service, on at least one of the first server or the second server, does not occur on the third server.

10. The system of 9, comprising:
a load balancer configured to:
receive a service execution request corresponding to a first service; and
delegate service execution workflow to invoke the first service into an execution state within more than one but fewer than all servers based upon the service distribution configuration.

11. The system of 10, the load balancer configured to:
specify one or more servers within the service execution workflow to invoke the first service into an execution state based upon the first service being assigned to the one or more servers within a first server to service execution mapping.

12. The system of claim 9, comprising:
a diagnostic component configured to:
upon one or more servers within the plurality of servers failing, generate diagnostic information comprising a list of running servers and respective services of the running servers.

13. The system of 9, the distribution configuration generator configured to:
maintain the service distribution configuration based upon resource requirements of respective services within the plurality of services.

14. The system of 9, the distribution configuration generator configured to:
maintain the service distribution configuration so that no server within the plurality of servers executes all services within the plurality of services and no service within the plurality of services executes on all servers within the plurality of servers.

15. A method for balancing server loads, comprising:
identifying a plurality of servers configured to host a plurality of services; and
for respective services within the plurality of services, generating a service exclusion configuration specifying at least one but fewer than all but two servers as excluded from invoking a service into an execution state, the service exclusion configuration specifying that a first server and a second server are to redundantly execute a current service, and that a third server is restricted from executing the current service so that problematic execution of the current service, on at least one of the first server or the second server, does not occur on the third server, at least some of at least one of the identifying or the generating implemented at least in part via a processing unit.

16. The method of claim 15, comprising:
receiving a service execution request corresponding to a first service; and
delegating service execution workflow to invoke the first service into an execution state within one or more servers based upon the service exclusion configuration.

17. The method of claim 16, comprising:
excluding from the service execution workflow one or more servers specified as excluded for the first service within the service exclusion configuration.

18. The method of claim 15, comprising:
upon one or more servers within the plurality of servers failing, generating diagnostic information comprising a list of running servers and respective services of the running servers.

19. The method of claim 15, the generating the service exclusion configuration comprising:
generating the service exclusion configuration based upon resource requirements of respective services within the plurality of services.

20. The method of claim 15, the generating the service exclusion configuration comprising:
generating the service exclusion configuration so that no server within the plurality of servers executes all services within the plurality of services and no service within the plurality of services executes on all servers within the plurality of servers.

\* \* \* \* \*